United States Patent Office 3,021,222
Patented Feb. 13, 1962

3,021,222
THICKENING AGENT AND METHOD OF MAKING THE SAME
Ralph W. Kerr, Riverside, and Frank C. Cleveland, Jr., Oak Park, Ill., assignors to Corn Products Company, a corporation of Delaware
No Drawing. Filed Apr. 27, 1959, Ser. No. 808,926
8 Claims. (Cl. 99—139)

This invention relates to new and improved thickening agents derived from starch. More particularly the invention relates to the use of starch partial esters of di- and polybasic acids as thickening agents, especially in fields where the end product is subjected to low temperatures.

Starch is used primarily as a paste or sol in aqueous media. As such, it has many useful applications both in the home and in industry such as, for example, a thickening agent in foods, e.g., soups and vegetables, as a suspending agent or emulsifying agent in salad dressings, as a suspending agent in oil well drilling muds, to name but a few uses. As finally prepared, pastes or sols of many varieties of starch are reasonably stable over normal periods of storage at normal temperatures, of let us say, 60 to 100° F., if maintained in a sterile condition. This is particularly true of noncereal starches, such as tapioca and of the so-called waxy starches, such as waxy maize or waxy sorghum. Pastes made from cereal starches show varying degrees of stability depending on botanical source. The instability that results in an undue thickening of the paste, or irreversible gel formation, is said to be due to retrogradation of certain starch molecules in aqueous media, a phenomenon well known in the art. Accordingly, in recent years native starches that show poor paste stability have been reacted chemically so as to make a derivative, the molecules of which are less prone to retrogradation. Thus, for example, in prior art, corn starch may be reacted with minor proportions of an acid such as acetic to form a partial ester (with respect to starch), or the corn starch may be reacted with a minor amount of etherifying agent such as ethylene oxide to form a partial ether (with respect to starch) and aqueous pastes of these corn starch derivatives have very much greater colloidal stability when aged at normal temperatures than pastes of the original corn starch.

However, all starches, either those having relatively good or poor paste stability at normal temperatures or the common starch derivatives of the ester or ether type, such as, for example, acetate, nitrate, hydroxyethyl ether, and methyl or ethyl ether, all have varying degrees of relatively poor paste stability, if the aqueous dispersion is held at subnormal temperatures, of let us say 40° F., and lower, for any prolonged holding period. Instability becomes very greatly exaggerated in all of these cases if the paste is frozen and then thawed by warming up to normal temperatures of 60 to 100° F. At lower storage temperatures, and particularly on freezing, what appears to be an extension of the retrogradation phenomenon is greatly accelerated and exaggerated. At lower temperatures all types of starch molecules, both linear and branched, tend to associate to the extent that their aqueous dispersions form a gel, an insoluble curd, or separate into a two phase system, one of which is a thin, watery liquid.

This instability to subnormal temperatures is particularly disadvantageous in foods wherein the starch is cooked and the food product is refrigerated before use, or even in canned foods which may be inadvertently frozen or otherwise subjected to subnormal temperatures during storage or transit. In these instances when the product is warmed before use, the product presents a most unappetizing appearance, unacceptable texture and taste. Very often these products cannot be reconstituted to their original consistency and texture, even on recooking and a total loss of product results. Poor cold paste stability is also an undesirable feature in a starch product in applications other than in foods. It is undesirable, for example, in liquid, aqueous adhesives, which may be stored for periods of time between preparation and use. Or it may be undesirable in aqueous liquid sizing preparations, as for example, in liquid laundry starch, which may be subjected to subnormal temperatures during transit or in warehouse storage during the interval between manufacture and use.

As a means of improving the stability of aqueous pastes of starch when stored at low temperatures and of preventing the total collapse of these colloidal systems of gelatinized starch, it has been proposed in the prior art to add various salts, adjuncts and plasticizers such as, for example, borax or polyethylene monostearate to the prepared starch paste. However, not only are these additives not wholly effective, but even to secure any significant improvement in cold paste stability requires the addition of proportions of these additives which cannot be tolerated in most applications for starch pastes. These mixtures have, accordingly, only a limited application.

Accordingly, the discovery of a method or principle, for modifying starch so that when it is gelatinized it would form a paste that is stable to subnormal temperatures, and even freezing and thawing, would be of tremendous practical importance.

It is an object of this invention to provide starch derivatives, the aqueous pastes or sols made of which will be stable over prolonged periods of time when stored at temperatures of 40° F., and lower.

It is a further object of this invention to provide a starch product, the aqueous paste or sol of which may be frozen and thawed and even if the cycle is repeated several times, the thawed paste will reconstitute to its original appearance, that is, as freshly prepared before the first freezing.

As indicated above, methods are already known in the prior art for chemically modifying starch so that pastes or sols of these products are relatively stable at normal temperatures of storage. It is also known in the prior art to modify starch by chemical derivatization so that when the starch product is gelatinized in aqueous media, the paste is very much more viscosity stable under certain adverse, or severe conditions, such as, for example, high cooking temperatures, pressure, shearing action, as well as the unfavorable action of substances that may be added to the paste before use, such as, for example, fruit or organic acids, sugar and the like. Stability of paste to these unfavorable use conditions is usually obtained in the prior art by treating the starch, usually before gelatinization, with a bi- or polyfunctional reagent, such as, for example, a polymetaphosphate, epichlorohydrin, cyanuric chloride, or phosphorus oxychloride. These reagents form cross-linkages between the starch molecules and thus impart the desired degree of paste stability to the unfavorable influences of viscosity of high temperature, pressure, shearing action and additives. Quite naturally, for some particular use of a starch product, it may be desirable to have paste stability at normal storage temperatures and paste stability against the unfavorable influences of high cooking temperatures, pressure, shearing action and additives as well as the herein described paste stability to low temperatures and to freezing and thawing. Accordingly, in the description of our invention which follows, although we may on occasion treat the starch by chemical modification, such as, for example, by a cross-linking reagent, to impart to the product these other types of paste stability, this treatment is not to be confused with, nor is it a necessary antecedent to, the type of chemical treatment that will hereinafter be described in considerable detail, to impart to the product paste stability to subnormal storage temperatures and to freezing and thawing the product. That is to say, in some starch products for some particular use we may desire to have stability, for example, to high cooking temperature under pressure, as well as to have a product which when cooked under these conditions will form a paste or sol which is stable when stored at subnormal temperature for prolonged periods of time.

We have now discovered the very surprising fact that if a starch is only partially esterified (with respect to the acid) by a di- or polybasic acid, even to a relatively low degree of substitution (in respect to starch), the relatively low D.S., partial ester (with respect to acid) forms a paste or sol in aqueous media which is vastly more stable when stored at temperatures of 40° F., and lower, than the paste or sol of the starch before derivatization, and which reconstitutes admirably when frozen and thawed, even when the freeze-thaw cycle is repeated many times. Examples of suitable di- or polybasic acids that we have found particularly useful for carrying out our invention are phosphoric, sulfuric, succinic, glutaric, maleic, malic and the products are respectively, the half or partial esters (in respect to acid), mono-starch phosphate, mono-starch sulfate, mono-starch succinate, etc., or the water-soluble alkali metal salts thereof.

This is an entirely unanticipated result. Products of the type described, and in particular, mono-starch phosphates, mono-starch sulfates, and mono-starch succinates, have been known heretofore and they may be made by several procedures known in the prior art. These products all are essentially polyelectrolytes when dispersed in water and as a class are the most colloidally labile group of starch derivatives. In common with other polyelectrolytes, the viscosity of their aqueous dispersions are very sensitive to neutral electrolyte, such as even NaCl, and their viscosity is highly dependent on acidity or alkalinity of the medium. Freezing and thawing is known to be an exceptionally rigorous condition to impose upon a colloidal system and has been used purposely to coagulate or destroy the colloidal state of many types of dispersions including aqueous starch sols and pastes. It would not be expected that a colloidal preparation of a starch product, such as a half, or partial ester of an acid, which is so very responsive to denaturation, flocculation or other colloidal change by common external agents would be relatively so very stable to low temperature treatment and to freezing and thawing, particularly when other colloidal systems of starch, and particularly starch derivatives of the ether and full ester type (such as, for example, hydroxyethyl ether and starch acetate), which are virtually unaffected by many external agents are, none the less, very unstable to freezing and thawing and other cold temperature treatment. The results of our discovery are the more surprising in view of the fact (as shown, among others, in an example which follows hereinafter) that when any given starch is made into an ester with a monobasic acid (e.g., acetic acid to form a starch acetate), and to a degree of starch substitution of the same order as starch partial esters that are the subject of this disclosure, the pastes of these esters of starch and monobasic acids are not significantly more stable to lower temperatures and to freezing and thawing than are pastes of the parent starch.

Typical methods for production, testing and use in accordance with this invention of several representative half and partial esters of starch are reviewed and described in the examples, which follow hereinafter. However, these examples are intended to be illustrative and not limiting. In carrying out our invention all botanical varieties of starch, such as, for example, corn, tapioca and waxy sorghum, may be used as well as their acid-made, thin-boiling starch products, oxidized modifications and their derivatives, such as, for example, gelatinizable starch ethers and full esters of starch with acids.

The degree of substitution of the starch with half or partial ester groups, that is necessary in order to obtain a product the paste of which shows very greatly improved stability to low storage temperatures, and to freezing and thawing, compared to pastes of the untreated starch, is of a relatively low order. The required D.S. will vary with the type of starch employed. However, in general, we have found that a D.S. with respect to half or partial ester groups of the order of about 0.02 to about 0.10 gives very excellent cold paste stability of the type required. That is to say, when between about 2 and about 10 half ester, or partial ester groups, are introduced into starch per 100 anhydroglucose units, very satisfactory paste stability to storage temperatures of 40° F., and to freezing and thawing will result. However, when the D.S. of the half or partial ester group is lower than about 0.02, for starches of inherently poor paste stability, such as corn starch, then although some improvement over pastes of the untreated starch may be noted, the improvement will not be sufficient to give a product with acceptable cold paste stability for many applications.

It is important to consider the above given D.S. range when reviewing the characteristics of certain starch products of the prior art that are actually partial esters with respect to acid, but which have been found to have unacceptable cold paste stability. For example, in prior art it has been proposed to esterify starch with a meta or polymetaphosphate, particularly with a trimetaphosphate. This reagent apparently forms a di-starch, orthophosphate ester with the starch. This reaction establishes a cross-linkage between two starch molecules, or chains, by means of an orthophosphate group. Inasmuch as orthophosphoric acid is tribasic, then a di-starch phosphate is actually only a partial ester of the acid. However, the D.S. of starch products of the prior art in respect to this partial ester group are of a very low order, often too low to be calculated from results of ordinary analytical procedures. Only a very few cross-linkages per 1000 monomer units are required significantly to alter the colloidal characteristics of a high polymer, and in this case, when as few as 10 to 20 cross-linkages per 1000 (1 to 2 per 100) anhydroglucose monomer units are introduced into the starch it becomes nongelatinizable on heating in water and completely loses its utility as a paste for any application. Accordingly, the phosphate cross-linked starches of the prior art, with a proportion of cross-linkages being even less than 1 per 100 monomer units, could not be expected to show improved cold paste stability, although these products are nonetheless, partial esters; this small ratio of cross-linkages is, however, sufficient materially to increase the paste stability to high temperatures, pressure and shearing stress and the adverse influence of fruit acids and sugar.

As already mentioned starch partial esters of phosphoric acid are suitable for the invention and among starch phosphates particularly suitable are those made in accordance with the principles described in application Serial No. 576,524, filed April 6, 1956, issued as U.S. Patent 2,884,413 on April 28, 1959, of which the present application is a continuation-in-part. Serial No. 576,524 was a continuation-in-part of Serial No. 388,914, filed October 28, 1953, now abandoned. According to U.S. Serial No. 576,524, when starch in semi-dry state is heated under certain conditions in contact with an inorganic phosphate salt from the group consisting of metaphosphates, polymetaphosphates, pyrophosphates, tripolyphosphates, and mixtures thereof, the starch reacts with the phosphate to form a partial ester (simple ester), or the salt of a partial ester of the starch and orthophosphoric acid. Optionally, the starch ester may be cross-linked by continuing the heat treatment in the presence of certain alkaline substances.

There appear to be three types of reactions between starch and the phosphate salts specified. The first, such as may take place when tripolyphosphate is used under neutral to slightly alkaline conditions, may be considered analogous in some respects to esterifications using an organic acid anhydride, such as acetic anhydride. Thus, just as this condensed or polyacetic acid is presumed to react in an exchange with starch (ROH)

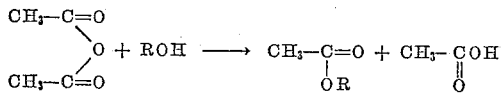

to give an acetic acid ester of starch and a molecule of acetic acid, so tripolyphosphate, for example, may react also in an exchange reaction involving one or more of the anhydro-phosphoric acid residues of the tripolyphosphate to form the orthophosphate ester of starch and leaving the corresponding acid:

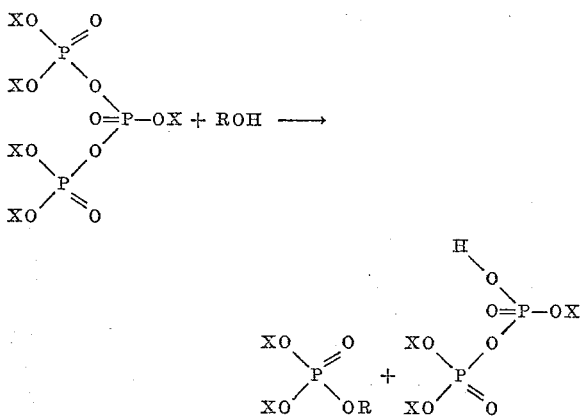

X represents H or monovalent metal

Starch may then conceivably react again in similar fashion with the acid dimer salt to give another starch orthophosphate ester group and a molecule of orthophosphate. In support of this theory, it has been noted that when sodium tripolyphosphate is heated with unbuffered starch, the pH value of the reaction mixture drops progressively from about 8.5 to 9, to values less than 7. In further support of this interpretation, electrometric titration of the polyphosphate with acid and alkali gives two inflection points when plotted graphically against pH, one at pH 3.5 and the other at pH 9.75, whereas the mono-starch phosphate and the by-product phosphate salts, both give two inflections, or "neutralization" points identical to those of orthophosphate which are pH 4.0 and pH 9.2, using procedures given hereinafter. The latter result is convincing proof that the starch product formed according to procedures hereinafter described is a mono-starch orthophosphate ester.

The second type of reaction may be simply an addition reaction, similar to the addition of HOH to metaphosphate to form orthophosphate. With starch and sodium metaphosphate this would be:

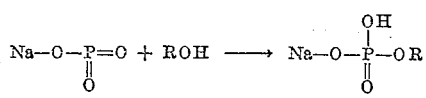

The third type of reaction, which when desired, may be induced to proceed prior to, simultaneously with, or subsequent to the first two reactions and may be considered as an extension of these first two reactions although preferably it is induced by adding an alkaline metaphosphate. This reaction leads to the production of di-starch orthophosphate in which the orthophosphate ester group establishes a cross-link between starch molecules. The reaction is illustrated using sodium trimetaphosphate:

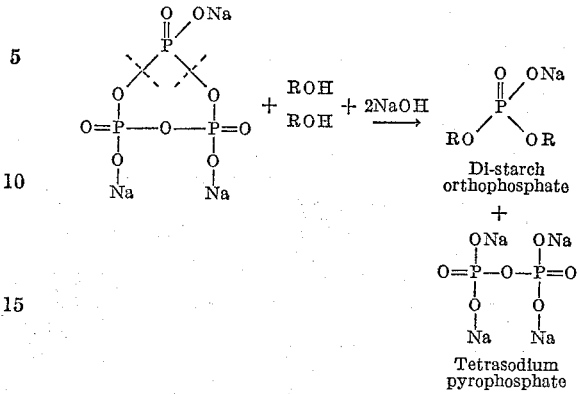

In carrying out our invention, the phosphate salt reagent is first added to starch. This addition may be effected in several ways. The simplest and one of the most effective ways is to add the phosphate to an aqueous starch slurry, at room temperature, and, when it is desired to produce a starch phosphate ester in granule form at a temperature insufficient to effect gelatinization of the starch, stir the slurry well and filter the same. If a phosphate salt is added to a starch slurry having a density between 17° Bé. and 22° Bé., which range has been found to cover practical operating conditions, the amount of such salt retained by the starch after filtration is about 10 to 75 percent of the salt originally added, depending upon conditions of addition and amount of washing. The filtrate, obtained from one such filtering operation and with appropriate additions of phosphate salt reagent to compensate for the amount retained by the filtered starch, may be used advantageously for starch to be treated subsequently.

Alternately, the slurry of starch in an aqueous solution of the phosphate reagent may be spray-dried or roll-dried, in which case all of the phosphate reagent added is incorporated with the starch. The starch may, or may not, be gelatinized during the spray-drying operation but is generally gelatinized by roll-drying. In fact, any desired method may be used for admixing the phosphate salt reagent and starch which tends to insure that the salt will be evenly distributed throughout the starch.

The amount of phosphate salt reagent admixed with the starch during the heat treatment to be described subsequently may vary from about 0.5 to about 10 percent calculated on the anhydrous salt, based on the dry weight of the starch, and the pH of the mixture as measured on a 20 percent aqueous dispersion of the mixture using a glass electrode, should be between 4 and 11.5, depending on the particular type of phosphate reagent employed and which of the three above described reactions is to be promoted. Use of pH levels less than about 4 promotes hydrolysis of the starch or starch product which is undesirable for many applications; use of pH levels higher than 11.5 makes possible alkaline degradation of the starch, hydrolysis of the meta- or polyphosphate and other side reactions all of which result in poor phosphorylation efficiency.

The second step of carrying out the present invention is to adjust the moisture content of the starch to 20 percent or below, a practical range being about 5 to about 20 percent, if, for example, the slurry method, which is the preferred method, has been used to admix the starch and phosphate salt. If it is desired to keep starch in granule form during the entire treatment, the starch-phosphate salt mixture may be dried satisfactorily in typical starch driers, e.g., those wherein heated air is forced through the drier. A drier of the continuous belt type sold by Proctor and Schwartz Company is satisfactory. Air temperatures of from 120° F. to 255° F., for example, are satisfactory in drying starch without gelatinizing it in this type of starch drying equipment. The temperature of the starch phosphate mixture during such drying should not exceed about 60° C. to 70° C. until the moisture content has been reduced to about 20 percent in order to insure the greatest beneficial effect from the added phosphate reagent in the production of mono-starch orthophosphate, and particularly if the starch granule form is to be preserved. It has been found that higher temperatures at higher moisture levels under such conditions of drying induce an undue amount of hydrolysis of the phosphate reagent and other undesirable side reactions involving the starch itself due to the long time of contact. However, when the drying is effected on heated rolls or by spray-drying, the initial moisture content may exceed 20 percent since the removal of moisture is instantaneous, as will be explained more fully hereinafter.

The next step in the process of our invention is the heat treatment. This should be carried out at about 100° C. to about 160° C., i.e., the temperature of the starch-phosphate salt mixture should be within this range to effect the desired reaction. Temperatures lower than 100° C. would produce virtually no phosphorylation if indeed such a reaction does occur at all at these lower temperatures. Temperatures substantially above 160° C. are difficult to control and the products may become discolored and degraded, making them less suitable for many applications, although such temperatures may be used if the time is extremely short and care is exercised in handling the product. The preferred range is 120° C. to 140° C. The time will depend upon the type of product desired. The solubility of the simple ester increases as the time, temperature, and amount of phosphate reagent increase and is greatest when all three are at their maximum. The degree of crosslinking, when this reaction is to be promoted, also increases as the time, temperature, and amount of phosphate reagent increase, but is primarily influenced by pH control appropriate to the type of phosphate reagent employed. Under some conditions, cross-linking may reach the point where the starch cannot be gelatinized. It is not practical to set forth the exact time, temperature and amount of salt for each product possible of production. However, with the aid of the information set forth in the examples which follow and suitable preliminary tests, such as gelatinization characteristics, paste viscosity, paste clarity, and the results of electrometric titration, those skilled in the art will be able to select conditions suitable to produce the product they desire.

The heat treatment of the starch-phosphate salt mixture at the temperature specified should be carried out in equipment which provides for removal of moisture. For example, one may employ a vacuum oven, infra-red heating of the material on a moving belt, etc.

It is also possible to effect the heat treatment on heated rolls or in a spray drier. In such cases, it is possible to effect gelatinization, drying and phosphorylation in one treatment provided the aforementioned conditions of pH and temperature are observed. Either a starch slurry or paste containing the phosphate may be roll or spray-dried. The moisture is reduced instantaneously by such methods to within the range heretofore specified and the phosphorylation reaction then can take place instantaneously also. In cases where roll or spray-drying of the material has been carried out at temperatures below those specified, it is possible to obtain the desired phosphorylation by subjecting the dried material to heat treatment at the proper temperatures.

After the heat treatment, the starch ester may be washed in appropriate solvents to effect purification and dried in conventional manner.

The process is applicable to any starch (corn (maize), wheat, grain sorghum, etc.) in raw or modified or derivatized form, in gelatinized or granule state. For example, in addition to raw starch, thin boiling starches, dextrins, derivatives of starch such as ethers and esters other than phosphate esters may be treated in accordance with the principles of our invention. The ethers and esters must contain at least one free hydroxyl group. The term "starch product," as used hereafter, is intended to include all of the aforementioned products.

The pH, as already mentioned, may vary from about 4 to about 11.5. At lower pH values the simple mono-starch phosphate esters are formed almost exclusively while at the higher pH values the cross-linked esters are formed. For example, at pH about 4 to 5 metaphosphates form substantially only simple esters. Above these pH values a very definitely larger proportion of di-starch phosphate (cross-linked esters) is formed. The pH values for the formation of simple esters when polymetaphosphates, pyrophosphates and tripolyphosphates are used are preferably from about 7 to 9, whereas from about 9 to 11.5, the cross-linked esters are formed to a very much larger extent. The degree of cross-linking increases with increase of pH. The pH may be increased by the addition of alkaline substances, such as sodium carbonate, sodium bicarbonate, sodium orthophosphate and sodium hydroxide, or other bases.

The end products of this invention will have a degree of substitution (D.S.) preferably up to 0.1 orthophosphate group per anhydro glucose unit, although obviously the degree of substitution (D.S.) may be increased substantially above this level by an extension of the procedures hereinafter described, and will be water-soluble or insoluble depending upon the degree of phosphorylation and the manner of treatment. They have improved properties in respect of paste clarity, significantly higher hot paste viscosity and a marked reduction in the tendency of cold paste body to increase with age ("set-back") and their pastes or sols have "long" flow as compared with properties of the starches from which they were derived.

Thus, for example, corn starch and certain products derived therefrom form cloudy or opaque and relatively short bodied pastes when dispersed or gelatinized in water and form typical, non-reversible gels at higher concentrations on standing. However, when corn starch is partially esterified so as to contain as little as 0.03 simple mono-starch phosphate group per anhydroglucose unit (D.S.=0.03) the colloidal properties of the gelatinized starch ester are so profoundly altered as a result of esterification that the paste now resembles a potato starch sol (to which it is now closely related in chemical structure by virtue of phosphate ester groups) and other non-cereal starches as well as the waxy starches. Thus the altered characteristics permit the use of the corn starch ester for such applictaions as the thickening of food products, such as soups, canned vegetables and fruits where a thick bodied, creamy, relatively clear thickening agent is preferable instead of an opaque, gel-like consistency which is obtained with corn and many other cereal starches.

When, and if, a relatively small number of di-starch phosphate cross-links are produced in the mono-starch phosphate ester either prior to, simultaneously with, or subsequent to production of the latter, then although in certain applications clarity of paste and freedom of set-back is preserved, the cross-linked, starch phosphate forms a relatively very thick, but very much less cohesive paste. Moreover, the cross-linked product forms pastes or sols with viscosity and body which are very much more stable to the effect of such agents or conditions as high temperature and pressure, shearing action, acidity, alkalinity or added soluble materials, such as sugars. In these improved characteristics, the mono-starch phosphate esters which are additionally cross-linked with a minor proportion of di-starch phosphate cross-links equal or excel the characteristics of waxy or non-cereal starches which are cross-linked by orthodox procedures such as by treatment with epichlorohydrin or by aldehydes. These partially cross-linked starch phosphates are accordingly particularly useful in applications where the starch pastes are subjected to destructive influences, such as, for example, to sugar and citric acid at high temperatures in gum drop candy manufacture, to sugar, acetic acid and heat in salad dressing manufacture, to sugar, fruit acids and temperature in the production of fruit pie fillings, particularly canned, cooked berry pie fillings as well as many other analogous operations.

From the foregoing it will now be apparent that a wide variety of products may be made for a large number of applications and that the number of mono-starch phosphate groups introduced as well as the proportion of di-starch phosphate cross-links may vary with the application. Thus, for example, for the thickening of cream style corn, substantially no cross-links are desirable and for the production of canned cherry pie fillings which may be subjected to autoclave pressures and temperatures a larger proportion of cross-links are desirable.

Before description of the specific examples analytical procedures and method for comparison will be described.

Phosphorus was determined by an adaptation of the method described by Howk and De Turk, Ind. Eng. Chem. Anal. Ed., 4, 111 (1932). All products were first extensively washed either in aqueous alcohol, or in the case of water insoluble product, in distilled water prior to analysis. In several instances samples of the starch products of the examples subsequently given were additionally purified by dialysis against distilled water with no significant change in phosphorus content.

Clarity of paste was determined by gelatinizing one percent by weight of starch in water at pH 6.5 in a boiling water bath for 30 minutes after the paste temperature reached 90° C., cooling to 25° C. for one hour and measuring the percent light transmission at $\lambda=650$ m$\mu$ in a Coleman spectrophotometer, Model 14.

Unless specified otherwise, phosphate D.S. was calculated according to the equation, D.S.=percent P of sample per percent P of a 1 D.S. starch phosphate, which is, D.S.=percent P of sample per 12.8.

Scott viscosity values were determined on hot pastes at pH 6.5 essentially as described by Kerr, "Chemistry and Industry of Starch," 2nd edition, Academic Press, Inc., New York (1950), pages 119 to 121. Because of the relatively high viscosity of some of the phosphate esters made from otherwise unmodified starch, a concentration of 5 grams, dry basis, in 280 ml. of water was used and the viscosity was reported as seconds for delivery of 50 ml. of the paste. Scott viscosity on the phosphate esters of acid modified starch (Table II) were determined at a concentration of 28.35 grams (at 12 percent moisture) in 280 ml. of water and viscosity was reported in seconds for delivery of 100 ml.

Stormer cold paste body, or consistency, was determined essentially as described by Kerr, "Chemistry and Industry of Starch," pages 123 and 124. Concentration of starch was varied from 5 to 15 grams per 280 ml. of water (as noted in Tables I and II) depending on the paste body and results were expressed as seconds per 100 revolutions.

The electrometric titration hereinabove referred to was run on 20 percent dispersions of the purified starch product in water into which was immersed the glass and secondary electrodes of a Beckman pH meter. The pH was first adjusted to a value slightly less than 2.0 with hydrochloric acid and then with stirring 0.1 N sodium hydroxide was added in small portions and the resulting pH noted. Finally, observed pH values were plotted against amounts of alkali added.

The following are examples of the application of the invention to practice. These specific examples are to be regarded as merely informative and typical and not as limiting the invention in any way.

EXAMPLE 1

*Reaction of corn starch with sodium metaphosphate at neutral pH*

Fifty-eight frams of commercial grade sodium metaphosphate was dissolved in 500 ml. of water. Then, one molar weight of corn starch (180 grams at 10 percent moisture) was stirred in. The pH of this mixture was adjusted to approximately 7 with NaOH. After 15 minutes, the starch was filtered by suction and the cake was air dried to approximately 12 percent moisture content. By analysis, it was found that 9 grams of sodium metaphosphate (0.09 mole) had been taken up by the starch, the balance being in the aqueous filtrate.

The starch was heated for one hour at 120° C. in a vacuum oven and then cooled. The product was washed three times by suspension in 250 ml. of water followed by filtration by suction. The pH of the first suspension was 5.4, indicating that phosphorylation took place between pH 7 and 5.4. The pH of the third wash was 6.0. The washed product was dried for analysis with results as shown in Table I. These results indicate a phosphorus content of 0.35 percent equivalent to a D.S. of 0.03 as orthophosphate groups. When this starch phosphate was gelatinized by heating in water a paste was formed of

TABLE I.—PROPERTIES OF STARCH PRODUCTS MADE IN EXAMPLES 1 TO 8 AND 10 TO 12

| Product | Reagent | Amt. reagent per molar weight starch, g. | Reaction time at 120° C., hrs. | D.S. as orthophosphate groups | Clarity as percent L.T. | Scott viscosity 5 g./280 ml. sec. per 50 ml. | Stormer consistency tests, 5 g. product in 280 ml. $H_2O$ 75 g. weight sec./100 revolutions | |
|---|---|---|---|---|---|---|---|---|
| | | | | | | | 1 hr. at 25° C. | 24 hrs. at 25° C. |
| Example 1 | Metaphosphate (pH 7) | 9 | 1 | 0.03 | 59 | 121 | [1] 102 | [1] 67 |
| Example 2 | Metaphosphate (carbonate pH 8.5) | 9 | 1 | .06 | | | | |
| Example 3 | Metaphosphate (pH 4) | 11 | 1 | .03 | 86 | 15 | 34 | 33 |
| Example 4 | Tripolyphosphate | 9 | 1 | .03 | 74 | 30 | 214 | 232 |
| Example 5 | ----do---- | 10 | 2 | .04 | 78 | 45 | [1] 52 | [1] 26 |
| Example 6 | ----do---- | 5 | 2 | .03 | 65 | 21 | 62 | 49 |
| Example 7 | ----do---- | 3 | 2 | .02 | 58 | 21 | 72 | 53 |
| Example 8 [2] | ----do---- | 8 | 1 | .04 | 77 | 28 | 122 | 130 |
| Example 10 | Hexametaphosphate | 7 | 1 | .03 | 60 | 21 | 57.3 | 57.3 |
| Example 11 | Pyrophosphate | 5 | 1 | .015 | 61 | 17 | 58.0 | 57.3 |
| Example 12 | {Tripolyphosphate {Metaphosphate | 9 5 | 1 | .05 | 76 | 570 | [1] 590 | [1] 540 |
| Corn starch | None | | | | 25 | 11 | [3] 34 | [3] 220 |
| Grain sorghum | ----do---- | | | | 35 | 11 | [3] 126 | [3] 422 |
| Potato starch | ----do---- | | | | 85 | 61 | 142 | 129 |
| Do | ----do---- | | | | 90 | 24 | 50 | 48 |

[1] 175 g. weight.
[2] Grain sorghum starch used; in all other examples, used corn starch.
[3] Used double the concentration of unmodified corn and grain sorghum starches because using 5 grams in 280 ml. of water, Stormer values were about 10 secs., to very nearly that of water.

very much greater viscosity (as indicated by Scott viscosity value) and body (as indicated by Stormer consistency values) which did not increase materially with age and with greatly improved clarity as compared with the untreated corn starch. Pastes showed no tendency to gel with age.

Comparing the characteristics of this product, such as percent phosphorus, clarity and viscosity of paste, with characteristics of products described in the following examples, particularly Examples 3 and 4, it is obvious that a portion of the phosphate groups introduced into the starch were di-starch phosphate cross-linkages. The initial phases of the phosphate cross-linking reaction produces an abnormally higher viscosity and a smaller increase in paste clarity for any given percentage of phosphorus introduced into the starch than does simple esterification.

EXAMPLE 2

*Reaction of corn starch with sodium metaphosphate and added sodium carbonate*

This example illustrates how cross-linking may be obtained to an extent that the product cannot be gelatinized in water. The procedure outlined in the preceding example (Example 1) was repeated with the exception that approximately 12.5 grams of a 4:1 mixture of sodium bicarbonate and sodium carbonate was added to the slurry of starch in the metaphosphate solution prior to the first filtration step. The pH of this mixture was 8.5. Analysis of the washed product, as shown in Table I, indicates that it contained 0.7 percent phosphorus.

When 5 grams of this starch phosphate was heated in 100 ml. of water at 95° C. for 20 minutes, the granules failed to gelatinize and settled from suspension when the cooked mixture was allowed to stand, indicating that the starch was highly cross-bonded with phosphate groups.

EXAMPLE 3

*Reaction of corn starch with sodium metaphosphate under acidic conditions*

The procedure outlined in Examples 1 and 2 was repeated with the exception that nothing was added to the mixture of corn starch and sodium metaphosphate in water. The pH of the starch slurry before filtration was 4.0.

After the dried starch cake had been heated for one hour at 120° C., it was thoroughly washed in water, at the same time the pH of the product being adjusted to 6.5 with dilute sodium hydroxide. The pH of the first aqueous suspension of the heated product was 4.1.

Characteristics of this product are shown in Table I. Pastes made from this starch phosphate were "long" in flow characteristics and of very high clarity. These properties, together with the lower paste viscosity of this product compared with the product of Example 1, indicate that there was much less cross-linking in the product of this example, than in the product of Example 1, and, of course, very considerably less cross-linking than in the product of Example 2.

These first three examples indicate that at lower pH values metaphosphate reacts with starch to form simple phosphate ester groups with little or no phosphate cross-linkages between starch molecules, but as the pH of reaction is raised, cross-linking becomes more pronounced.

EXAMPLE 4

*Reaction of corn starch with sodium tripolyphosphate for one hour at 120–130° C.*

One molar weight of corn starch (180 grams at 10 percent moisture) was stirred into 215 ml. of water into which had been dissolved 15.5 grams of sodium tripolyphosphate. The pH was approximately 8.5. The starch was filtered by suction to form a cake of approximately 45 percent moisture content. This was dried at 60° C. to approximately 12 percent moisture content. By analysis, 9 grams of the polyphosphate (0.08 mole calculated as a sodium monophosphate) was retained by the starch, the balance being in the aqueous filtrate.

This starch was now heated with stirring, and with provision for moisture removal, at temperatures between 120 and 130° C. and then cooled. The starch product suspended in 250 ml. of water, now showed a pH of 7.0. It was filtered and washed twice more by suspension in 250 ml. of water followed by filtration with suction. The starch was then dried to a commercial moisture content of approximately 10 percent for a powdered starch.

Analytical values shown in Table I indicate that the product contained 0.37 percent phosphorus, equivalent to a starch phosphate ester with a D.S. of 0.03 as orthophosphate groups. The starch when gelatinized by heating in water formed a very viscous sol (as indicated by Scott viscosity value) with little or no tendency to gel or increase in viscosity with age (as indicated by Stormer consistency values). The sol had very high clarity compared with untreated corn starch (both measured at pH 6.5) and had "long" flow characteristics similar to tuber or waxy starches.

EXAMPLE 5

*Reaction of corn starch with sodium tripolyphosphate for two hours at 120° C.*

The procedure essentially as described in the previous example (Example 4) was repeated with the exception that the heating period at 120° C. was extended to 2 hours.

The characteristics of the purified product as shown in the table indicate that phosphorylation was increased so that the starch product contained 0.47 percent P (equivalent to D.S. 0.04 as orthophosphate groups). This resulted in a product which when gelatinized by heating in water gave a sol of higher viscosity, higher clarity and heavier body when cold than the product of the preceding example. The colloidal properties of this product compared favorably with those of two randomly selected commercial potato starch samples, as shown in Table I.

EXAMPLES 6 AND 7

*Reaction of corn starch with different amounts of sodium tripolyphosphate at 120° C.*

The procedures given in Example 5 were repeated essentially as described with the exception that preliminary conditions were so adjusted that lesser amounts of sodium tripolyphosphate were taken up by starch for reaction in the dry state at 120° C. for 2 hours.

In Example 6, a molar weight of starch took up 5 grams of the polyphosphate, and in Example 7, 3 grams. As shown in Table I, the finished products formed pastes with progressively less clarity, less viscosity and body than corn starch which had been similarly treated with 9 grams of the salt.

EXAMPLE 8

*Reaction of grain sorghum starch with sodium tripolyphosphate*

The procedure given in Example 4 was repeated with the exception that grain sorghum starch was used instead of corn starch. After one hour reaction period at 120° C., the washed product had a phosphorus content of 0.44 percent equivalent to a D.S. of 0.04 as orthophosphate groups, as shown in Table I. This starch phosphate ester formed a sol with exceptionally high clarity and high viscosity and which showed practically no tendency to retrograde or to set to an irreversible gel on standing. The flow of this paste was long and stringy resembling pastes of the tuber and waxy starches.

EXAMPLE 9

*Reaction of acid-modified, thin-boiling corn starch with sodium tripolyphosphate*

An acid-modified, thin-boiling corn starch (having an alkali fluidity of 50 and a 28.35 grams Scott test approximately 40 seconds per 100 ml.) was treated with sodium tripolyphosphate in a variety of ways. The object was to show not only that it is feasible to phosphorylate a modified starch product by our process in order to improve its colloidal properties but also to show:

(1) That the amount of modification in properties is dependent on the amount of sodium tripolyphosphate used, other conditions being the same.
(2) And that simply adding the tripolyphosphate to the starch in an aqueous slurry does not materially improve the colloidal properties of the starch. That is, the polyphosphate does not act as a plasticizer or dispersing agent or other type of adjunct sufficiently to modify the paste properties, per se, but rather the decided improvement which results in paste properties when starch is treated with tripolyphosphate in our process is the result of an esterification reaction and the creation of a starch phosphate, as claimed, such as takes place almost entirely in the dry-heating phase of our process.

(A) Approximately 30 grams of sodium tripolyphosphate was dissolved in 400 ml. of water to which was added with stirring 180 grams of a commercial 50-fluidity grade of corn starch at 10 percent moisture content. The starch was filtered, the cake was air-dried to approximately 12 percent moisture content and then the starch was heated for one hour at 120° C. It was found that the starch had taken up approximately 6 grams of the tripolyphosphate. The starch product was triple washed with water and dried to 10 percent moisture content as detailed in Example 1.
(B) The experiment was repeated using only 15 grams of the tripolyphosphate to 180 grams starch in aqueous suspension.
(C) The experiment was repeated using only 7.5 grams of the tripolyphosphate to 180 grams of starch in aqueous suspension.
(D) Part A was repeated in every detail except the heating period at 120° C. was omitted.

The characteristics of the treated starch products are compared with those of the untreated, 50-fluidity corn starch in Table II below:

TABLE II.—CHARACTERISTICS OF TREATED AND UNTREATED 50-FLUIDITY CORN STARCH

| Product | Sodium tripolyphosphate retained per 180 g. of starch, g. | D.S. as orthophosphate groups | Paste clarity as percent L.T. | Scott vis. 28.35 g./280 ml. sec. per 100 ml. | Stormer consistency 15 g./280 ml. conc. and using 75 g. weight sec./100 revolutions | |
|---|---|---|---|---|---|---|
| | | | | | 1 hr. at 25° C. | 24 hrs. at 25° C. |
| A | 6 | 0.031 | 88 | 43 | 34 | 41 |
| B | 3 | 0.019 | 83 | 42 | 30 | 80 |
| C | 1.5 | 0.016 | 82 | 40 | 32 | 94 |
| D (not heated) | 6 | -------- | 61 | 41 | 35 | 214 |
| 50-F starch, untreated | -------- | -------- | 58 | 40 | 43 | 178 |

From these results it will be seen that the properties of a premodified starch, such as clarity of paste and consistency stability on standing, are improved in the same manner as a native starch is improved by phosphorylation. It will also be observed that the extent of improvement depends on the amount of tripolyphosphate added to the starch before the reaction period. It will be noted further that simply treating starch with sodium tripolyphosphate in aqueous solution, without providing more optimal conditions for phosphorylation to take place does not materially alter the characteristics of the starch.

EXAMPLE 10

*Reaction of corn starch with sodium hexametaphosphate*

One molar weight of corn starch was stirred into 215 ml. of water containing 12.8 grams of sodium hexametaphosphate. The pH was 7.4. The starch was filtered by suction and air-dried. By analysis it was found that the starch had taken up approximately 7 grams of the phosphate (0.07 mole as sodium metaphosphate).

The air-dried starch was heated for one hour whereupon it was cooled and washed three times by suspension in 250 ml. water and filtering by suction. The final pH was 6.7.

Data on this product set forth in Table I show that a starch phosphate ester formed with a D.S. of 0.03 as orthophosphate groups and that the ester formed a sol in water which had higher viscosity and clarity than untreated corn starch and no tendency to set up to a gel on standing.

EXAMPLE 11

*Reaction of corn starch with tetrasodium pyrophosphate*

The procedure given in Example 10 was repeated, using tetrasodium pyrophosphate instead of sodium hexametaphosphate and dissolving 10 grams of the salt in the water used to slurry the starch. The pH of this phosphate-starch slurry was 8.5. Approximately 5 grams of the phosphate was taken up by the molar weight of starch. The purified final product had a phosphorus content of 0.18 percent equivalent to a D.S. of 0.015 as orthophosphate groups. As shown in Table I, this product formed a sol when heated with water which had somewhat higher viscosity and clarity than untreated corn starch. Pastes made from the starch showed no tendency to thicken on standing.

EXAMPLE 12

*Reaction of corn starch with a combination of sodium Tripolyphosphate and sodium metaphosphate*

The following example is given to illustrate how both cross-linking and simple phosphorylation may be simultaneously controlled by use of a combination of different phosphates. In this example sodium tripolyphosphate at pH 7.9 was used to effect substantially simple monostarch phosphate production and a lesser addition of metaphosphate was added which at this pH produces substantially only distarch phosphate cross-linkages.

The procedures given in Example 4, using tripolyphosphate and corn starch, were repeated essentially as described with the exception that sufficient commercial sodium metaphosphate was added to the aqueous starch slurry so that the filtered starch cake took up 5 grams of the sodium metaphosphate as well as 9 grams of sodium tripolyphosphate per 162 grams, dry basis corn starch. The pH of the final slurry was 7.9.

After drying the filtered starch cake to approximately 10 percent moisture content, it was heated for one hour at 120° C., cooled and suspended in water (162 g. in 265 ml.). The pH was 6.5. The starch product was filtered, washed twice more by suspension in water and filtering, and then air-dried to a moisture content of 10 percent.

Analytical results on the purified product, shown in Table I, are typical for a mono corn starch orthophosphate ester of about 0.03 to 0.04 D.S. which has also been cross-linked with a limited amount of di-starch phosphate groups.

EXAMPLE 13

*Production of starch phosphate by spray-drying starch and pyrophosphate*

Grain sorghum starch was stirred into water into which had been dissolved 0.5 lb. of sodium pyrophosphate for each 100 lb. of starch treated. The starch concentration in the slurry was approximately 10 percent. Equal quantities of tetrasodium pyrophosphate and disodium dihydrogen pyrophosphate were employed so as to adjust the pH level to 7.0. This slurry was then heated with stirring to approximately 210° F. and after it had become sufficiently fluid, it was fed to the atomizing nozzle (Spray Systems Company) of a parallel air flow, spray drier at an atomization pressure of 6,000 to 7,000 p.s.i. gauge. The inlet air temperature was 340° F. and the outlet temperature was 230° F. During this cycle, the starch was gelatinized and dried to a moisture content of approximately 5 percent.

The product from the spray drier was a white powder which readily dispersed in cold water to form a relatively heavy bodied, homogeneous, smooth, colloidal system. This product showed characteristics which made it ideal as a food thickening agent, particularly in applications where a cold mixing starch product is desirable, as, for example, in the preparation of pudding desserts where the pudding ingredients are not cooked but merely mixed with cold aqueous fluids. It was also noted that this starch product was substantially odorless and tasteless and remained so for extended periods of time when stored as a dry powder, in contrast to spray-dried or roll-dried cereal starches in general, such as untreated grain sorghum, corn and wheat, which have characteristic starchy flavors as made and which develop foreign, unpleasant odors and tastes on storage.

A 25 gram sample of this product was prepared for analysis by extraction with 250 ml. of 50 percent by volume aqueous methanol for 72 hours. The product was filtered by suction and washed on the filter with two, 100 ml. portions of 50 percent aqueous methanol. The cake was then extracted for 24 hours with 200 ml. of 50 percent aqueous methanol, filtered by suction and again washed on the filter with two, 100 ml. portions of 50 percent aqueous methanol. The product was then dehydrated by successive washes with absolute methanol during a period of 24 hours and air-dried.

Analysis for phosphorus by the Parr bomb method described previously showed 0.091 percent, which is equivalent to a phosphate content of 0.273 percent, dry basis.

EXAMPLE 14

*Production of starch phosphate by spray-drying a mixture of starch and pyrophosphate and additionally heating the product from the spray drier*

Starch was treated as in Example 13 and the dry powdered product from the spray drier at 5 percent moisture content, was fed as a thin layer to the belt of a continuous heater. Heating of the starch on the belt was accomplished by infra-red radiation. Movement of the starch on the belt was at such a rate, and the radiation was of such intensity that the starch product of Example 13 was heated to approximately 350° F. in 60 to 90 seconds and maintained at this temperature for 90 seconds. At the end of the belt, the starch product was cooled to room temperature in about 5 seconds.

During this heating, the moisture content of the starch product was reduced to the level of approximately 1 percent.

The product of this example formed a much more viscous colloidal mass when stirred into cold water than the product of Example 13. Moreover, the paste or sol was exceptionally homogeneous and smooth and proved to be a relatively efficient emulsification agent particularly for oil in water emulsions, such as, for example, vegetable oil in dilute vinegar as in the preparation of salad dressings.

This starch phosphate was equally as free from odor and taste and was equally as stable in these respects on storage as the product of Example 13.

A sample of this starch phosphate was purified for analysis by the procedure given in Example 13. The content of phosphorus found was 0.102 percent, which is equivalent to a phosphate content of 0.306 percent, dry basis.

For comparison, grain sorghum starch, purified by aqueous methanol and absolute methanol extraction, in the manner used to purify the products of Examples 13 and 14, showed a phosphorus content of 0.031 percent, which is equivalent to a phosphate content of only 0.093 percent, dry basis.

From these comparisons it is obvious that some phosphorylation of the starch occurred during the spray-drying operation, under the conditions, temperature and time, employed in Example 13; 0.273−0.093=0.180 percent phosphate groups were introduced by these procedures, which it is believed accounts for the improved colloidal properties and the improved odor and taste of the product compared to untreated starch which is merely spray-dried or roll-dried.

During the secondary heating stage, employed in Example 14, phosphorylation by the added pyrophosphates was further increased, 0.306−0.093=0.213 percent phosphate groups, now having so been introduced into the starch product. It is believed that this further increase in phosphate ester groups introduced, accounts for the further improvement in colloidal properties of the product, particularly its improved stabilizing effect on oil in water emulsions and the excellent homogeneity of a cold water dispersion of the powdered product.

EXAMPLE 15

*Spray-drying and heating mixture of corn starch and pyrophosphate*

Corn starch was wet blended with 0.5 percent pyrophosphate and the mixture spray-dried according to the procedures outlined in Example 13. The dried powdered product was additionally heated by the method given in Example 14. The final corn starch phosphate was quite comparable to the product obtained in Example 14. Compared to corn starch which had merely been spray-dried and heated, the product of Example 15 dispersed very much more readily in cold water, formed a much more homogeneous and viscous aqueous system, was a much more effective emulsifier for oil, particularly vegetable oil, in water and had substantially no taste or foreign odor even on extended storage.

EXAMPLE 16

*Higher ratio of pyrophosphate to starch*

The procedures given in Examples 13 and 14 were repeated using a ratio of 2.5 percent added tetrasodium pyrophosphate and 2.5 percent disodium dihydrogen pyrophosphate to starch. The final product formed a very viscous, homogeneous mass when mixed into cold water.

However, the product of this example had a slight characteristic phopsphate salt taste which may be objectionable for certain food uses. Accordingly where the product is to be used as a thickener, gelling agent, emulsifier or suspension agent for food products, it is recommended that the total pyrophosphate addition be within the range of 0.50 to 1.00 percent to the weight of starch treated.

Other proportions of the sodium pyrophosphate to the acid sodium pyrophosphate have been employed, with resulting pH levels of the reaction mixture being different from the level employed in Example 13, which is pH 7.0. When higher proportions of the acid sodium pyrophosphate are used and when pH levels lower than about pH 6.0 are used, the end products are comparable to those obtained in Examples 13 and 14 except that cold water dispersions are of higher clarity and the viscosities are lower. This is due no doubt to the acid hydrolysis of the glucosidic linkages in the starch polymer, brought about by the acidity present at the temperatures employed. When higher proportions of the tetrasodium pyrophosphate were used, and when the pH value of the reaction mixture was higher than about pH 8.0, then the product developed a yellowish to brownish color, and a slight caramelized flavor, due quite likely to an atmospheric oxidation of the starch molecule at the alkalinity and the temperatures employed.

Accordingly, although starch may be phosphorylated with condensed phosphates, such as pyrophosphate and tripolyphosphate, using make-up pH values over a wide range of from about pH 4 to pH 11, and using a spray-drying technique illustrated in Example 13, preferably followed by an additional heating period, or using a conventional roll-drying operation followed by a heating period at appropriate temperatures and times, the preferred operating pH make-up range is between about 6.0 and 8.0, for reasons above outlined.

EXAMPLE 17

*Spray-drying and heating mixtures of starch and tripolyphosphate*

The procedures given in Examples 13 and 14 were repeated with the exception that instead of the added pyrophosphates, 1 percent of sodium tripolyphosphate was added to the starch and the slurry make-up was pH 8.0.

A starch phosphate resulted, quite comparable to the product obtained in Example 14.

EXAMPLE 18

*Prepared pudding mixture requiring no cooking*

A slurry was prepared in water at a total dry substance concentration of 11.2 percent, containing the following proportion of ingredients:

| Ingredient | Percent |
|---|---|
| Starch phosphate as made in Example 8 | 60.0 |
| Sucrose | 35.2 |
| Ethavan flavor mix | 3.0 |
| Sodium chloride | 1.0 |
| Monostearin | 0.8 |
| | 100.0 |

The slurry was heated to gelatinize the starch and dry it to a powder, using a conventional type spray-drier operating at drier temperature of 300° F.

The dry powder was then dry-blended with other ingredients in the following proportions by weight:

| Ingredient | Percent |
|---|---|
| Spray-dried, starch phosphate mix | 46.0 |
| Dextrose, powdered | 15.0 |
| Sucrose, powdered | 33.32 |
| Vanilla color mix | 1.0 |
| Imitation vanilla sugar | 4.0 |
| Sodium chloride | 0.5 |
| Rennin | 0.02 |
| Calcium acetate | 1.0 |
| Imitation butter | 0.16 |
| | 100.00 |

The mixture was ground to pass an 80 mesh screen.

Then, approximately 3.85 ounces of the prepared pudding powder was stirred into a pint of cold milk (62° F.) and stirring was continued for 30 seconds. A homogeneous pudding mixture developed, which on standing 15 minutes exhibited the consistency, texture and flavor of the conventional, cooked starch pudding.

EXAMPLE 19

*Dessert composition for use with cold fluids*

A dry blend was prepared, using the product of Example 13 in the following formulation.

| Ingredients: | Dry weight, percent |
|---|---|
| Starch phosphate (Example 13) | 18 |
| Powdered sucrose | 75 |
| Sodium chloride | 1 |
| Sodium pyrophosphate, decahydrate | 2 |
| Calcium acetate | 1 |
| Flavor and color blended on powdered dextrose | 3 |
| | 100 |

One hundred grams of this dry blend was stirred into 425 ml. of cold milk and the mixture was beaten with a hand beater for about 1 minute. The prepared pudding was poured into dishes and allowed to stand for 15 to 30 minutes. A very smooth, heavy bodied starch pudding of the blanc mange type developed, but without the taste characteristically imparted by cereal starches.

EXAMPLE 20

*Use of cross-linked starch phosphate in the production of canned cherry pie fillings*

Canned cherry pie fillings were prepared as follows: 3.5 lbs of cross-linked starch phosphate, as prepared in Example 12, was stirred into 16 lbs. of water to make a slurry.

This slurry was added to a batch of cooked cherries prepared as indicated below.

A mix was made of the following ingredients:

| Ingredient | | Amount |
|---|---|---|
| Drained cherries (frozen and thawed) (5 parts cherries, 1 part sucrose), total | lbs | 64 |
| Cherry juice (5 parts juice, 1 part sucrose), total | lbs | 21 |
| Sucrose | lbs | 8 |
| Corn sirup | lbs | 4 |
| Artificial color | oz | 0.15 |

The mix was stirred slowly while cooking to 190° F. At this time the starch phosphate slurry was added and the temperature was raised to and held at 196° F. for 10 minutes.

Thereupon the hot prepared pie fillings were poured into cans and sealed. The cans were then immersed in boiling water for 10 minutes and cooled to room temperature.

Cherry pie fillings were similarly prepared using untreated corn starch.

At periodic intervals, over several weeks' time, cans of each of the two pie fillings were opened. Fillings made containing starch phosphate remained fluid but of satisfactory consistency and the liquid portion was clear. Fillings made of untreated corn starch were fluid as made, but after about two days, set to opaque gel-like mass.

Cherry pies were made and baked from both types of fillings. The cherry pie fillings made from the starch phosphate were fluid, of a very desirable consistency, clear and of a very attractive appearance. Those made from untreated corn starch were opaque, whitish in appearance and gel-like in consistency.

EXAMPLE 21

*Pie filling mix for use with cold fluids*

A dry powdered blend was prepared by intimately mixing the following ingredients.

| Ingredients: | Dry weight, percent |
|---|---|
| Starch phosphate (Example 14) | 10 |
| Sucrose, powdered | 30 |
| Dextrose, powdered | 29 |
| Cocoa | 13 |
| Vegetable shortening | 8 |
| Evaporated corn syrup solids | 6 |
| Dry milk solids | 2.5 |
| Sodium chloride | 1.0 |
| Flavor (1% ethyl vanillin on 99% dextrose) | 0.5 |
| | 100.0 |

Six ounces of this preparation was well mixed with 160 ml. of milk. A very smooth, heavy bodied cream pie filling developed which when placed in baked pie crusts was ready for eating without cooking. The flavor of the chocolate cream pie was free of taste associated with cereal starches.

EXAMPLE 22

Powdered salad dressing preparation

An intimate mixture was prepared in dry form from the following ingredients.

| Ingredients: | Dry weight, percent |
|---|---|
| Starch phosphate (Example 14) | 26.5 |
| Sucrose | 45.0 |
| Dextrose | 12.0 |
| Sodium chloride | 9.0 |
| Egg white solids | 4.0 |
| Powdered mustard | 3.4 |
| Paprika and other flavors | 0.1 |
| | 100.0 |

Two ounces of the above powdered mixture was used to emulsify 160 ml. of vegetable oil in 60 ml. of vinegar plus 120 ml. of water, using a power driven kitchen mixer. A very smooth, heavy bodied, stable salad dressing developed of the appearance of mayonnaise, which had no characteristic cereal starch flavor.

When a spray-dried product prepared either from untreated grain sorghum or corn starches was used in the formulations given in Examples 19, 21 and 22 in place of the starch phosphates, in each case products resulted which had unacceptably thin body, were poor in texture and developed characteristic cereal starch flavor.

EXAMPLE 23

Starch phosphate in cream style corn

In canining sweet corn (cream style), field tests have shown that starch phosphate prepared in accordance with Example 4 gave the same consistency to cream style corn as twice the weight of untreated corn starch. Moreover, the consistency was smoother with starch phosphate since it was superior in preventing curdling of the sweet corn protein during the cooking and canning operation.

EXAMPLE 24

Use of starch phosphate to prevent water-loss in oil well drilling muds

Starch phosphate, as made in Example 4, was gelatinized in 10 percent aqueous sodium chloride and added to a conventional drilling mud in a proportion of 3.5 lbs. starch phosphate per barrel of mud. The mass was agitated with a high speed mixer for 5 minutes at room temperature. Water-loss was determined in a standard American Petroleum Institute wall building tester filter press, applying a pressure of 100 p.s.i. The filtrate was collected over a 14 minutes interval and the number of milliliters collected between one minute and 14 minutes was noted and this value, for comparative purposes was multiplied by two. Portions of the prepared mud mixture were allowed to stand at room temperature for 24 hours and at 150° F. for 24 hours. The water-loss values are shown below.

Two commercial starch products sold as drilling mud adjuncts under the trademarks "Impermex" and "Mylogel" were tested at the same concentration using the same drilling mud with results as follows:

COMPARATIVE WATER-LOSS VALUES

| Test | Starch phosphate | "Impermex" | "Mylogel" |
|---|---|---|---|
| Initial | 7.8 | 13.0 | 14.0 |
| 24 hrs. at room temperature | 7.2 | 11.8 | 12.0 |
| 24 hrs. at 150° F | 6.0 | 11.6 | 12.2 |

These results show that water-loss was almost 100 percent more when either of the commercial starches was used than when using starch phosphate.

EXAMPLE 25

This example illustrates the production of a mono-starch phosphate ester of white milo starch and its improved cold paste stability on freezing and thawing. The starch was esterified by procedures given in our copending U.S. patent application, Serial No. 560,902, filed January 23, 1956, now U.S. Patent No. 2,961,440, dated November 22, 1960. (Application Serial No. 560,902 covers a process for making starch phosphates by heating starch containing less than 5 percent of moisture with a water-soluble acid salt of an inorganic polybasic oxyacid in the ortho form at temperatures within the range of about 160° C. to about 200° C.) One kilo of white milo starch was stirred into 1.2 liters of water which contained dissolved therein 88 grams of $NaH_2PO_4 \cdot H_2O$. The resulting slurry was stirred for one hour at room temperature, during which time sodium hydroxide was added to adjust the pH value to 6.2.

The slurry was filtered by suction and the cake was dried to a moisture content of 5.2 percent. The dried cake was ground to a powder that showed by analysis, 1.0 percent phosphorus, dry basis. The dried powder was heated at 180° C. for 15 minutes during which time the moisture content dropped to 0.72 percent.

A small portion of the reaction mixture was repeatedly washed in a mixture of one part water plus one part methanol, filtered and dried, for analysis. The phosphorus content was 0.53 percent, dry basis.

$$(D.S. = 0.053 \times \text{percent P.})$$

The balance of the reaction product, essentially a mono-starch orthophosphate of D.S.=0.027, containing less than 0.5 percent phosphorus as unreacted sodium phosphate, was tested for paste stability at lower temperatures as follows: Two batches of pastes were prepared, in one case adding a ratio of 5 grams of the starch product to 95 grams of water and in another case adding a ratio of 5 grams of the starch product to 95 ml. of a 37° Brix sucrose solution in water. In both cases the pH values of the slurries were between 6.1 and 6.3. The starch slurries were heated in a boiling water bath for 15 minutes, cooled to about 45° C. and then 35 gram portions of the pastes were transferred to 50-ml., graduated glass centrifuge tubes. These tubes were then subjected to freezing by placing in a bath at −7° C. for 21 hours. The tubes were then removed and allowed to thaw by standing in a bath at 30° C. for 2 hours. The tubes were then centrifuged at 2500 r.p.m. for 30 minutes and the volume of clear supernatant fluid, if any, separating from the paste was recorded.

The freeze thaw cycle was then repeated every 24 hours.

TABLE III.—VOLUME OF LIQUOR (ML.) SEPARATING FROM PASTES (35 GRAMS) OF WHITE MILO STARCH AND FROM ITS MONO-STARCH PHOSPHATE WHEN SUBJECTED TO FREEZING AND THAWING

| | Number of freeze-thaw cycles | | | | | | | | | |
|---|---|---|---|---|---|---|---|---|---|---|
| | 1 | 2 | 3 | 4 | 5 | 6 | 7 | 8 | 9 | 10 |
| White milo starch phosphate in water | 0 | 0 | 0 | 1.0 | 1.9 | 2.8 | 4.4 | 6.7 | 8.4 | -- |
| White milo starch in water | 0 | 2.5 | 5.7 | 10 | 12 | 11 | 13 | -- | -- | -- |
| White milo starch phosphate in sucrose | 0 | 0 | 0 | 0 | 0 | 0 | 0 | 0 | 0 | 0 |
| White milo starch in sucrose | 0 | 0 | 0 | 4 | 9 | 12 | 13 | 13 | -- | -- |

The results in Table III, above, show that pastes of the white milo mono-starch phosphate in water were completely stable for at least 3 freeze-thaw cycles; even after seventh freeze-thaw cycle only 4 to 5 ml. of a liquid phase could be centrifuged from 35 grams of the paste. This small amount of liquor, of the order of 4 to 5 ml., is considered not to be sufficient to render the pastes unacceptable. Pastes of the white milo mono-starch phosphate in 37° Brix sucrose in water solutions were completely stable to freezing and thawing even though the number of freeze thaw cycles was extended to 10 additional cycles beyond the first 10 indicated in the table, or 20 cycles in all.

For comparison, the 5 percent starch pastes made from white milo starch prior to phosphating, showed significantly less freeze-thaw stability. Five percent pastes of white milo starch in water showed separation of an excessive proportion of a clear watery phase after the fourth freeze-thaw cycle, and showed an accelerated breakdown thereafter, becoming complete at about the sixth freeze-thaw cycle. Five percent pastes of white milo starch in 37° Brix sucrose solutions showed an unacceptably large separation of aqueous phase at about the fifth freeze-thaw cycle.

EXAMPLE 26

The following example shows the use of a mono-starch phosphate, with improved cold paste stability, in the making of a so-called white sauce for food products, and shows the results of freezing and thawing on this white sauce compared to similar products made from an untreated starch.

Twenty-two grams of the white milo mono-starch phosphate, described and tested in Example 25 was blended with 50 grams of a commercial brand of vegetable shortening that had been melted by slight warming. To this blend, 1080 grams of skim milk and 7.5 grams of salt (NaCl) were added and the mixture lightly beaten until a smooth consistency was obtained. The mixture was placed in a double boiler type of saucepan and heated therein with stirring. The water in the lower portion of the double boiler was at approximately 100° C. The sauce mixture gradually thickened as the starch gelatinized. Heating the sauce was continued for 5 minutes after the sauce had thickened. The cooked sauce was then poured into lacquer coated tin cans, weighing out 120 grams of the sauce into each can. The cans were sealed and placed in a freezing chamber at —20° C.

A set of identically prepared test cans of sauce was prepared, using 22 grams of untreated white milo starch instead of the 22 grams of white milo mono-starch phosphate.

Periodically, test cans were removed from the freezer and were placed in a water bath at 35° C. for one hour. The thawed test cans were centrifuged for 15 minutes at about 6000 r.p.m. and the contents of the cans inspected and compared with white sauces made identically to the two sauces hereinabove described, but which were centrifuged after cooling to room temperature and with the freezing and thawing operation omitted. In test cans where a phase separation had taken place after the centrifuging operation, the supernatant liquid phase was carefully decanted into a graduated cylinder for measurement and inspection.

Before the freezing and thawing operation both of the sauces prepared either from the white milo starch, or from the white milo mono-starch phosphate, were completely stable after the centrifugation period.

Even after freezing at —20° C. for only one week and then thawing, white sauces made from white milo starch were quite unstable and showed a separation of about 40 ml. of a clear, watery thin liquid phase (from 120 grams of test sample). During a freezing period of a month the amount of thin supernatant increased by only a slight amount, to as high as 45 ml. in some cases, indicating that more or less complete breakdown in the sauce had occurred during the first week. On the other hand, sauces prepared from the white milo mono-starch phosphate remained completely stable during the entire one month storage at —20° C. and on thawing and centrifuging, showed no separation of a thin watery phase, whatsoever.

EXAMPLE 27

The following example again illustrates the production and testing of a starch product the paste of which is made relatively stable to freezing and thawing by the introduction of mono-starch phosphate groups, in accordance with procedures essentially as given in Example 25, but using a white milo starch that had been treated with sodium trimetaphosphate in accordance with procedures given in U.S. Patent 2,801,242, so as to introduce di-starch phosphate cross-linkages into the starch in order to improve the paste stability of the product to high temperatures, pressure and shearing stresses, as well as to the adverse influences of fruit acids and sugar.

The white milo starch was cross-linked by use of sodium trimetaphosphate, by adding 0.56 gram of sodium trimetaphosphate to 100 grams (dry basis) of white milo starch that was suspended in about 120 ml. of water into which had been dissolved 2 grams of NaCl and sufficient NaOH to give a reaction pH of 11. The slurry was stirred at 110° F. for about 4 hours during which time the hot paste Scott viscosity of the product was reduced to 50 seconds/100 ml. using 10 grams of starch product per 280 ml. of water. The starch product was then acidified, filtered, thoroughly washed with water and neutralized with NaOH. Analysis of a purified sample of the trimetaphosphate cross-linked white milo starch showed a phosphorus content of 0.010 percent, scarcely higher than the value of 0.006 percent phosphorus, obtained by analysis of the untreated white milo starch.

The above described starch product was then heated in the dry state with sodium orthophosphate in the manner indicated in Example 25. A sample of the purified reaction product showed on analysis, 0.46 percent P, which is equivalent to a D.S. of 0.025 as mono-starch phosphate groups. (D.S.=0.053×percent P.)

This trimetaphosphate cross-linked white milo mono-starch phosphate was tested for cold paste stability by the procedures as given in Example 25. The results of the tests are given in the table below. For comparison, the freeze-thaw stability results are also given for pastes made from the trimetaphosphate cross-linked white milo starch.

Also for comparison are given the freeze-thaw stability test results for a portion of the trimetaphosphate cross-linked white milo starch that had been esterified with the monobasic acid, acetic acid, by adding acetic anhydride to an aqueous slurry of the trimetaphosphate cross-linked white milo starch, with added alkaline catalyst, according to orthodox procedures. The acetyl content of this product was 1.48 percent, equivalent to an acetate ester D.S. of 0.05.

TABLE IV.—VOLUME OF LIQUOR (ML.) SEPARATING FROM 5 PERCENT STARCH PASTES (35 GRAMS) WHEN SUBJECTED TO FREEZING AND THAWING

| Pastes in water | Number of freeze-thaw cycles |||||||||| 
|---|---|---|---|---|---|---|---|---|---|---|
| | 1 | 2 | 3 | 4 | 5 | 6 | 7 | 8 | 9 | 10 |
| Mono-starch phosphate of trimetaphosphate cross-linked white milo starch | 0 | 0 | 0 | 0.5 | 1.3 | 2.8 | 4.0 | 5.4 | 7.1 | 8.0 |
| Acetate of trimetaphosphate cross-linked white milo starch | 2.7 | 4.8 | 7.1 | 8.8 | 10.7 | 13.5 | 14.5 | 16 | | |
| Trimetaphosphate cross-linked white milo starch | 4.0 | 7.8 | 11.1 | 13.3 | 15.0 | | | | | |

The data in the table show that the trimetaphosphate cross-linked white milo starch paste is relatively unstable to freezing and thawing; a significant proportion of thin liquid separated from the paste in water after the first freeze-thaw cycle, and after the fifth cycle, the paste was virtually completely broken down into coagulum and a thin, clear watery phase. The addition of acetyl groups equivalent to a D.S. of about 0.05 did not very materially improve the cold paste stability of the trimetaphosphate cross-linked white milo starch; even after the second freeze-thaw cycle, by syneresis, an unacceptable proportion of a watery phase had separated from the paste and after about 7 freeze-thaw cycles the paste had completely broken down. This result, on introducing acetyl groups, is in marked contrast to the results shown in Example 29, wherein introduction of half ester groups of succinic acid into a cross-linked white milo starch gave complete stability of paste to freezing and thawing, and the result is in contrast to the results shown in this example, wherein introduction of mono-starch phosphate groups, to the extent represented by D.S. 0.026, into the trimetaphosphate cross-linked white milo starch gave a product, the paste of which was substantially completely stable in water after 4 freeze-thaw cycles. The latter product gave a paste in 37° Brix sucrose solution that was completely stable even after 7 freeze-thaw cycles, whereas a paste of the trimetaphosphate cross-linked white milo starch in 37° Brix sucrose solution was completely broken after the fifth freeze-thaw cycle and the paste of the acetylated, metaphosphate cross-linked white milo starch in 37° Brix sucrose solution was unacceptable at the end of the fourth freeze-thaw cycle and completely broken down at about the seventh to eighth freeze-thaw cycle.

EXAMPLE 28

This example illustrates the use of the product made in accordance with procedures given in Example 12 as the thickening agent in canned fruit pie fillings, and the superior cold paste stability of the product when these fruit pie fillings were stored for prolonged periods of time at storage temperatures of 40° F.

For comparison, comparable pie fillings were made using unreacted corn starch and also from a trimetaphosphate cross-linked white milo starch, which is sold in considerable volume as a commercial product to the baking trade for use as the thickening agent in fruit pie fillings, in accordance with U.S. Patent 2,852,393. This pie filling starch is identical to the product, the preparation of which is described, among others, in Example 27, and is named therein as, trimetaphosphate cross-linked white milo starch.

In all three series, canned cherry pie fillings were prepared essentially as described in Example 20. Cases of canned fillings from the three series were stored in a constant temperature room at 40° F. Periodically, a can of pie filling from each series was opened and the contents inspected.

Even after one week at 40° F. pie fillings made using the unreacted corn starch were gelled or the starch containing filling coagulated, giving an unappetizing appearance. Pies baked using these fillings were unacceptable.

Fillings made using the trimetaphosphate cross-linked white milo starch were quite satisfactory in appearance, texture and taste up until about the fifth or sixth week of storage at 40° F. After this time the pie filling appeared to gel or coagulate with the syneresis of an undue amount of thin watery phase.

Pie fillings made from the monophosphate ester of trimetaphosphate cross-linked corn starch were, quite surprisingly, completely stable even after one year of storage at 40° F. The fillings showed the identical appearance they had when first packed. Pies were baked using these canned fillings that had been stored for one year and they were to all appearances the same, and of excellent flavor and taste, compared to freshly prepared and cooked cherry pie filling made with the monophosphate ester of the trimetaphosphate cross-linked corn starch as thickening agent.

EXAMPLE 29

The following example illustrates, among other things, the production and testing of a starch with greatly improved cold paste stability by chemically reacting the starch with a minor proportion of succinic anhydride to form a low D.S., half ester of succinic acid.

In this example a white milo starch sample was used as substrate, that had already been reacted with a very minor proportion of epichlorohydrin (a starch cross-linking reagent) in order to improve stability of paste to high temperature, pressure and shearing action, and the adverse effects of added fruit acid or sugar. This cross-linking had been accomplished by suspending 1 kilo of white milo starch in 1.75 liters of water in which had been dissolved 12.25 grams of NaOH and 40.7 grams of NaCl and then adding to the slurry, with stirring at 45° C., 0.473 gram (0.0009 mole per molar weight of starch) of epichlorohydrin. This slurry at pH 11.4 was then stirred at 45° C. for 40 minutes. At this time a neutralized and water-washed sample of the product had a Scott hot paste viscosity of 84 sec./100 ml., using 11 grams of the starch product in 280 ml. of water.

One hundred grams of the epichlorohydrin cross-linked, white milo starch (dry basis) in 125 ml. of water, was treated with 2.5 grams of dry succinic anhydride at a reaction pH of approximately 10, and at a temperature of 27° C. for about an hour. The reacted starch slurry was then neutralized and thoroughly washed with water, after which the starch acid succinate was filtered and dried.

This product on analysis by saponification was found to contain 1.35 percent succinic acid groups in combination with the starch, and this combined succinic acid was found by titration of the starch product with standard alkali to have one free carboxyl group. The product was, accordingly, a half ester of succinic acid of D.S. 0.02, cross-linked with a very minor proportion of propylene glycol di-ether bridges.

This product, an epichlorohydrin cross-linked, white milo starch acid succinate, was tested for cold paste stability by procedures essentially as given in Example 25. For comparison, the cold paste stability of a sample of the epichlorohydrin cross-linked, di-ether of the white milo starch was also determined. These results are given in Table V below:

TABLE V.—VOLUME OF LIQUOR (ML.) SEPARATING FROM 5 PERCENT STARCH PASTES (35 GRAMS) WHEN SUBJECTED TO FREEZING AND THAWING

| | Number of freeze-thaw cycles | | | | | | | |
|---|---|---|---|---|---|---|---|---|
| | 1 | 2 | 3 | 4 | 5 | 6 | 7 | 8 |
| PASTE IN WATER | | | | | | | | |
| Epichlorohydrin cross-linked, white milo starch acid succinate | 0 | 0 | 0 | 0 | 0 | 0 | 0 | 0 |
| Epichlorohydrin cross-linked white milo starch | 1.3 | 5.8 | 9.7 | 13.0 | 15.0 | | | |
| PASTES IN 37° BRIX SUCROSE SOLUTION | | | | | | | | |
| Epichlorohydrin cross-linked white milo starch acid succinate | 0 | 0 | 0 | 0 | 0 | 0 | 0 | 0 |
| Epichlorohydrin cross-linked white milo starch | 0 | 0.3 | 7.9 | 10.3 | 11.8 | 13.0 | 14.3 | 15.0 |

The results in the table show that the paste of the epichlorohydrin cross-linked white milo starch was relatively unstable to freezing and thawing. In water alone, it started to separate even after the first freezing and thawing cycle and after only the fifth cycle, 15 ml. of clear liquid separated from 35 grams of paste. At this stage the paste was substantially completely broken down into a coagulum and thin liquid phase, in which very little additional liquid phase can be separated and there is no point in running the test for additional freeze-thaw cycles. In contrast, the succinic acid half ester of this epichlorohydrin cross-linked white milo starch gave a paste which showed no separation either in water or in sucrose solution. Both of these tests were extended to 20 freeze-thaw cycles and, both in water and sucrose solution, the succinate half ester pastes showed no separation of a thin liquid phase, whatsoever, and they were, in all appearances, identical to the pastes as they appeared before the first freeze-thaw cycle.

The paste of the white milo starch, cross-linked with epichlorohydrin is also seen by results in the table to be relatively unstable to freezing and thawing in sucrose solution, completely breaking down after about the eighth freezing and thawing.

EXAMPLE 30

This example illustrates the production of a starch product the paste of which is extremely stable to low temperature storage and to freezing and thawing by reacting corn starch (of inherently poor cold paste stability) simultaneously in aqueous slurry with trimethylamine sulfur trioxide so as to form a half ester of sulfuric acid and with a minor proportion of sodium trimetaphosphate so as to introduce a very small percentage of di-starch phosphate cross-linkages and to impart stability of paste to higher temperatures, pressures and shearing action as well as to the adverse effect of additives.

This product was prepared by adding 180 grams of corn starch to 220 ml. of water into which had been dissolved 22 grams of $Na_2SO_4$ (as a granule swelling inhibitor) and sufficient NaOH to adjust the pH value to 10. While stirring at 40 to 45° C., a total of 4.63 grams of trimethylamine sulfur trioxide and 0.5 gram of sodium trimetaphosphate were added in small portions, adding meanwhile dilute sodium hydroxide solution to maintain the pH value of the reaction mixture at 10. The reaction mixture was held at 40° C. for 3 hours. The starch product was then thoroughly washed with water, meanwhile neutralizing the product, finally filtering and drying.

The dry product showed, dry basis, 0.65 percent sulfur, equal to a D.S. of 0.035 as mono-starch sulfate groups, and 0.017 percent phosphorus which would be equal to a D.S. of 0.009 as di-starch phosphate cross-linking groups, but correcting for the phosphorus originally present in corn starch as impurity, the D.S. would be about 0.003 as di-starch phosphate. (Phosphate D.S.=0.053×percent P.)

Five percent pastes were made of this phosphate cross-linked, corn starch acid sulfate, both in water and in 37° Brix sucrose solutions in water. They were tested by the freezing and thawing procedures outlined in Example 25. These pastes, both in water and sucrose solutions were found to be completely stable after 7 freeze-thaw cycles at which time the tests were discontinued. In a duplicate test, pastes in sucrose solution were completely stable after 30 freeze-thaw cycles.

EXAMPLE 31

Example 30 was repeated with the following changes: (A) White milo starch, cross-linked with epichlorohydrin, was reacted with sufficient succinic anhydride in order to give a half ester with a D.S. of 0.074; (B) white milo starch was treated as in the first example, (A), but cross-linking was accomplished, to a comparable degree, by reaction with sodium trimetaphosphate in aqueous alkaline slurry. The succinate D.S. was 0.079 and the D.S., as di-starch phosphate cross-linkages was of the order of 0.001 to 0.002; (C) white milo starch was treated as in the second sample, (B), but sufficient succinic anhydride was used to give a starch half ester with a D.S. of 0.10 as succinate groups.

Five percent aqueous pastes of all three products were made in water and in 37° Brix cane sugar solution. These pastes were tested for freeze-thaw stability by procedures given in Example 25. All pastes were completely stable after the tenth freezing and thawing cycle, at which point the test was abandoned, and these products gave every indication of being as stable as the cross-linked, starch half ester of succinic acid, described in Example 30.

However, when 5 percent pastes of these starch products in 37° Brix cane sugar solution were acidified to pH 3.5 by adding citric acid, these pastes were noticeably less stable to freezing and thawing than pastes in cane sugar at the normal pH of about 6. In the cases of the acidified cane sugar solutions, it was apparent, moreover, that stability to freezing and thawing was a function of the succinate D.S. of the half esters, the higher the D.S. of the products tested, the greater the stability. For example, an acidified cane sugar paste of the succinate described in Example 30 began to show signs of breaking down after about the fourth freeze-thaw cycle, whereas products (A) and (B) of this example were stable even after the sixth freeze-thaw cycle in acidified sugar solution and product (C) was stable even after the tenth freeze-thaw cycle.

We claim:
1. A pudding composition which is cold mixing and setting comprising a pregelatinized orthophosphate ester of starch, and flavoring materials.
2. A pudding composition which is cold mixing and setting comprising a mixture of flavoring ingredients and a pregelatinized and dried mixture of an orthophosphate ester of starch, a sugar and a plasticizer.
3. A cooked fruit pie filling comprising fruit, sugar, and as a thickening agent an orthophosphate ester of starch.
4. A method of making a colloidal suspending medium which is unaffected by freezing and thawing which comprises making an aqueous paste of about 2 to about 10 parts by weight of a starch derivative per 100 parts of paste, said starch derivative being selected from the group consisting of starch half esters of dibasic acids, starch partial esters of polybasic acids, and the water-soluble salts thereof.
5. A composition of matter comprising an aqueous starch paste which is colloidally stable at storage temperatures of 40° F. and less, and is colloidally stable after freezing and thawing, said aqueous paste containing a starch derivative selected from the group consisting of starch half esters of dibasic acids, starch partial esters of polybasic acids, and the water-soluble salts thereof.
6. A method of improving cooked and frozen foods which comprises preparing said foods in an aqueous starch paste containing between about 2 and about 10 parts by weight of a starch derivative per 100 parts of paste, said starch derivative selected from the group consisting of starch half esters of dibasic acids, starch partial esters of polybasic acids, and the water-soluble salts thereof.
7. A cooked fruit pie filling that is colloidally stable at storage temperatures of 40° F. and less, and is colloidally stable after freezing and thawing, said cooked fruit pie filling comprising fruit, fruit juices, sugar, water and a starch derivative selected from the group consisting of starch half esters of dibasic acids, starch partial esters of polybasic acids, and the water-soluble salts thereof.
8. A cooked white sauce that is colloidally stable after freezing and thawing, comprising milk solids, salt, shortening, water and a starch derivative selected from the group consisting of starch half esters of dibasic acids, starch partial esters of polybasic acids, and the water-soluble salts thereof.

References Cited in the file of this patent

UNITED STATES PATENTS

| | | |
|---|---|---|
| 2,500,179 | Hinz et al. | Mar. 14, 1950 |
| 2,852,393 | Kerr et al. | Sept. 16, 1958 |
| 2,865,762 | Neukom | Dec. 23, 1958 |
| 2,884,412 | Neukom | Apr. 28, 1959 |